United States Patent
Lassalas et al.

(10) Patent No.: US 8,837,883 B2
(45) Date of Patent: Sep. 16, 2014

(54) SHAPING LASER BEAM LAUNCHES INTO OPTICAL FIBERS TO YIELD SPECIFIC OUTPUT EFFECTS

(75) Inventors: Bruno Lassalas, Irvine, CA (US); Michael J. Papac, Tustin, CA (US); Michael J. Yadlowsky, Sunnyvale, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 168 days.

(21) Appl. No.: 13/241,386

(22) Filed: Sep. 23, 2011

(65) Prior Publication Data
US 2013/0077917 A1    Mar. 28, 2013

(51) Int. Cl.
*G02B 6/34* (2006.01)
*G02B 27/09* (2006.01)
*G02B 19/00* (2006.01)
*G02B 6/42* (2006.01)

(52) U.S. Cl.
CPC .......... *G02B 19/0047* (2013.01); *G02B 27/095* (2013.01); *G02B 27/0944* (2013.01); *G02B 19/0014* (2013.01); *G02B 6/42* (2013.01)
USPC .................. 385/37; 65/385; 385/52; 385/74; 219/121.78

(58) Field of Classification Search
CPC .............. G02B 6/124; G02B 27/0927; G02B 27/0955; G02B 27/30; G02B 6/26; G02B 6/32; G02B 27/09; G02F 1/011; H01S 3/094003; G01S 5/4012; A61B 2018/00636; A61B 2019/6206; H04B 10/1127; H04B 10/2543; H04B 10/2581; H04B 10/503
USPC .......... 385/37, 28, 31, 39, 52, 38, 74; 65/385; 372/25; 210/121.78

See application file for complete search history.

(56) References Cited

U.S. PATENT DOCUMENTS

| | | | | |
|---|---|---|---|---|
| 4,648,892 A | * | 3/1987 | Kittrell et al. .................... | 65/387 |
| 4,705,351 A | * | 11/1987 | Toda ................................ | 385/74 |
| 4,907,851 A | * | 3/1990 | Marhic ............................ | 385/24 |
| 5,117,474 A | * | 5/1992 | van den Bergh et al. ....... | 385/39 |
| 5,281,214 A | | 1/1994 | Wilkins et al. | |
| 5,463,215 A | * | 10/1995 | Alfille ......................... | 250/206.1 |
| 5,921,981 A | * | 7/1999 | Bahmanyar et al. ............. | 606/4 |
| 6,064,786 A | * | 5/2000 | Cunningham et al. .......... | 385/38 |
| 6,078,704 A | * | 6/2000 | Bischel et al. .................... | 385/4 |

(Continued)

OTHER PUBLICATIONS

Zhang et al., Design of laser beam divergence angle program control system. Proc. SPIE 7506, 2009 International Conference on Optical Instruments and Technology: Optical Systems and Modern Optoelectronic Instruments, 75060P (Nov. 25, 2009).*

*Primary Examiner* — Peter Radkowski

(57) ABSTRACT

Certain embodiments may include a laser system configured to emit collimated laser light, a beam diverging element configured to diverge the laser light to yield a range of propagation angles with a maximum angle greater than zero, and fiber coupling optics configured to direct the diverged laser light towards a spot of a cross-section of a fiber core of an optical fiber. As another example, certain embodiments may include a laser system configured to emit collimated laser light, a beam shaping element configured to shape the laser light into a beam with an elliptical cross-section, and fiber coupling optics configured to direct the diverged laser light towards a spot of a cross-section of a fiber core of an optical fiber, where the spot's center point is located at a distance from the cross-section's center point.

11 Claims, 1 Drawing Sheet

(56) References Cited

U.S. PATENT DOCUMENTS

| | | | |
|---|---|---|---|
| 6,212,216 B1* | 4/2001 | Pillai | 372/96 |
| 6,530,697 B1* | 3/2003 | Johnson et al. | 385/88 |
| 6,572,608 B1 | 6/2003 | Lee et al. | |
| 6,674,941 B2* | 1/2004 | Tatum et al. | 385/33 |
| 6,804,436 B2* | 10/2004 | Healy | 385/33 |
| 6,984,230 B2 | 1/2006 | Scheller et al. | |
| 7,402,158 B2 | 7/2008 | Scheller et al. | |
| 7,473,249 B2 | 1/2009 | Scheller et al. | |
| 7,766,904 B2 | 8/2010 | McGowan, Sr. et al. | |
| 2002/0025096 A1* | 2/2002 | Wang et al. | 385/8 |
| 2002/0064191 A1* | 5/2002 | Capewell et al. | 372/14 |
| 2003/0103725 A1* | 6/2003 | Li | 385/34 |
| 2003/0118282 A1* | 6/2003 | Tatum et al. | 385/33 |
| 2003/0118283 A1* | 6/2003 | Healy | 385/33 |
| 2003/0142903 A1* | 7/2003 | Johnson et al. | 385/31 |
| 2003/0219201 A1* | 11/2003 | Arimoto et al. | 385/31 |
| 2004/0160998 A1* | 8/2004 | Gruhlke et al. | 372/29.021 |
| 2004/0240767 A1* | 12/2004 | Kimura et al. | 385/11 |
| 2005/0069255 A1* | 3/2005 | Nishimura et al. | 385/31 |
| 2005/0111338 A1* | 5/2005 | Katsuma et al. | 369/112.23 |
| 2005/0180707 A1* | 8/2005 | Furman et al. | 385/115 |
| 2005/0259916 A1* | 11/2005 | Jenkins et al. | 385/31 |
| 2006/0039656 A1* | 2/2006 | Windover | 385/88 |
| 2006/0245702 A1* | 11/2006 | Cazzini | 385/115 |
| 2006/0285796 A1* | 12/2006 | Cheng | 385/38 |
| 2007/0096014 A1* | 5/2007 | Mikuriya et al. | 250/216 |
| 2010/0142041 A1* | 6/2010 | Berman | 359/385 |
| 2012/0203075 A1 | 8/2012 | Horvath et al. | |

* cited by examiner

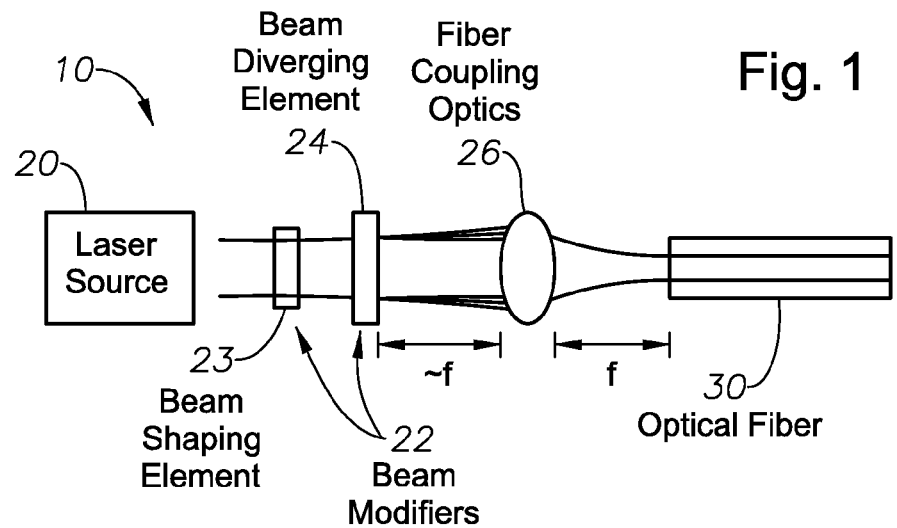
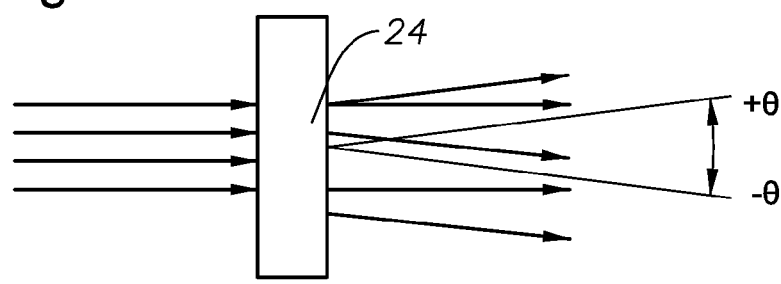
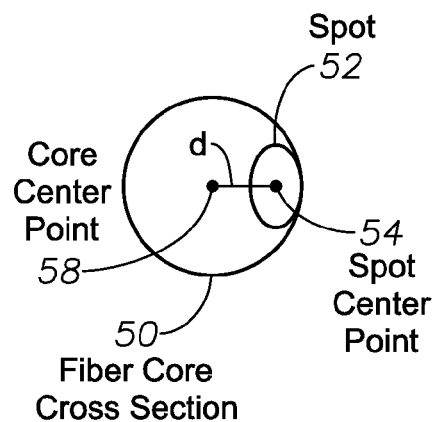

SHAPING LASER BEAM LAUNCHES INTO OPTICAL FIBERS TO YIELD SPECIFIC OUTPUT EFFECTS

TECHNICAL FIELD

The present disclosure relates generally to illumination systems, and more particularly to shaping laser beam launches into optical fibers to yield specific output effects.

BACKGROUND

In certain situations, light launched into an optical fiber should have a large range of propagation angles. For example, certain optical fibers have a high numerical aperture (NA) (e.g., NA greater than 0.5) that can yield a wide angular distribution of light. To make use of this, the light launched into the fiber should have a range of propagation angles that is up to, equal to, or exceeds the propagation angle corresponding to the NA of the fiber. In other words, the light should nearly fill, fill, or overfill the fiber NA.

In addition, in certain situations, light launched into an optical fiber should have a spot that illuminates a large portion of the core of the fiber. For example, light with a large spot that illuminates most or all of the core may yield a spatially uniform illumination pattern, but light with a small spot (especially one near the edge of the core) may yield a spatially or angularly non-uniform (even asymmetric) illumination pattern.

According to etendue, at any point along a beam, the product of the beam diameter and NA cannot decrease. In well-corrected optical systems, the etendue of the beam is conserved throughout its propagation path, so NA and spatial beam size are inversely proportional. For coupling into fiber optics with a given beam etendue, setting either the launch NA or focal spot size determines the launch angle. For example, focusing a beam with high NA optics yields a large range of propagation angles at the focus, but produces a small focal spot, typically on the order of the wavelength of light. Conversely, focusing a beam with optics designed to produce a large focal spot yields a small range of propagation angles at the focus. Accordingly, certain optics fail to provide satisfactory results in certain applications.

BRIEF SUMMARY

Certain embodiments may include a laser system configured to emit collimated laser light, a beam diverging element configured to diverge the laser light to yield a range of propagation angles with a maximum angle greater than zero, and fiber coupling optics configured to direct the diverged laser light towards a spot of a cross-section of a fiber core of an optical fiber. As another example, certain embodiments may include a laser system configured to emit collimated laser light, a beam shaping element configured to shape the laser light into a beam with an elliptical cross-section, and fiber coupling optics configured to direct the diverged laser light towards a spot of a cross-section of a fiber core of an optical fiber, where the spot's center point is located at a distance from the cross-section's center point.

BRIEF DESCRIPTION OF THE DRAWINGS

Exemplary embodiments of the present disclosure are described by way of example in greater detail with reference to the attached figures, in which:

FIG. 1 illustrates an example of a system that may be used to direct light to an optical fiber according to certain embodiments;

FIG. 2 illustrates an example of a beam diverging element according to certain embodiments; and FIG. 3 illustrates a spot of a light beam with respect to a cross-section of the fiber core of an optical fiber according to certain embodiments.

DETAILED DESCRIPTION OF THE INVENTION

Referring now to the description and drawings, example embodiments of the disclosed apparatuses, systems, and methods are shown in detail. The description and drawings are not intended to be exhaustive or otherwise limit or restrict the claims to the specific embodiments shown in the drawings and disclosed in the description. Although the drawings represent possible embodiments, the drawings are not necessarily to scale and certain features may be exaggerated, removed, or partially sectioned to better illustrate the embodiments.

According to certain embodiments, a beam diverging element (e.g., a small angle diffuser or diffractive element) is incorporated into focusing optics used to couple spatially coherent light (such as white laser light) into an optical fiber (e.g., a small diameter multimodal fiber) so that the light entering the fiber has a spot size and numerical aperture that matches those of the fiber. Accordingly, the beam diverging element can be used to control the spatial and angular illumination profiles. In addition, the beam diverging element can reduce the power density of the light at the entrance of the fiber, which may reduce the possibility of damage to fibers, especially to glass or polymer fibers.

Certain embodiments may include a laser system configured to emit collimated laser light, a beam diverging element configured to diverge the laser light to yield a range of propagation angles with a maximum angle greater than zero, and fiber coupling optics configured to direct the diverged laser light towards a spot of a cross-section of a fiber core of an optical fiber. As another example, certain embodiments may include a laser system configured to emit collimated laser light, a beam shaping element configured to shape the laser light into a beam with an elliptical cross-section, and fiber coupling optics configured to direct the diverged laser light towards a spot of a cross-section of a fiber core of an optical fiber, where the spot's center point is located at a distance from the cross-section's center point.

FIG. 1 illustrates an example of a system 10 that may be used to direct light to an optical fiber to yield an illumination pattern with controlled spatial and angular profiles. In certain embodiments, system 10 may be used for a surgical instrument inserted into a human (or other living or previously living) body for medical purposes, such as for ophthalmic surgery. For example, system 10 may be used for an endoilluminator surgical instrument for projecting light into an interior of an eyeball. In the illustrated example, system 10 includes a laser system 20, one or more beam modifiers 22 (such as a beam shaping element 23 and a beam diverging element 24), fiber coupling optics 26, and an optical fiber 30.

Laser system 20 emits any suitable laser light, such as polychromatic (e.g., white) laser light. Light has rays that typically have a range of propagation angles up to a maximum angle. In certain embodiments, laser system 20 emits collimated laser light. For example, laser system 20 includes a laser source that emits light and a lens that collimator lens that collimates the light. Collimated light has rays that are substantially parallel, that is, the maximum angle is substantially zero degrees.

A beam modifier 22 is a set of one or more optical elements that modify spatial and/or angular features of light. System 10 may include any suitable beam modifiers 22, such as beam diverging element 24, beam shaping element 23, or beam diverging element 24 and beam shaping element 23.

Beam diverging element 24 diverges laser light to increase the range of propagation angles of the light. Examples of beam diverging elements 24 include diffusers, diffractive optical elements, and holographic optical elements. A diffuser diffuses laser light and may comprise a flashed opal plate with a rough surface. A diffractive optical element diffracts laser light to yield laser light comprising a plurality of rays travelling in different directions. Examples of diffractive optical elements include diffraction gratings and binary optics. A holographic optical element splits and diffracts laser light to yield laser light comprising beams travelling in different directions. Examples of holographic optical elements include holographic gratings, holographic diffusers, blazed gratings, volume phased holographic gratings.

In certain situations, the beam etendue is smaller than that of a fiber. Beam diverging element 24 may be used to increase the etendue of the beam to match that of the fiber.

FIG. 2 illustrates an example of a beam diverging element 24. In the example, beam diverging element 24 diverges collimated light. Collimated light has a maximum angle of zero, so beam diverging element 24 diverges the light to yield a maximum angle greater than zero with respect to a non-diverged component. The maximum angle may have any suitable value, such as a value that is near to, equal to, or greater than the angle corresponding to the numerical aperture of optical fiber 30. The angle corresponding to the numerical aperture of an optical element may be the maximum angle of the range of angles accepted or emitted by the optical element.

Beam diverging element 24 may have any suitable optical characteristics. In certain embodiments, beam diverging element 24 may selected to yield a maximum angle $\theta_{max}$ according to:

$$\theta_{max} \sim \arctan(r_{spot}/f_{optics})$$

where $r_{spot}$ represents the radius of the spot of the core cross section, and $f_{optics}$ represents the focal length of the fiber coupling optics. For example, for $r_{spot}=10$ μm and $f_{optics}=3000$ μm, $\theta_{max}=0.2°$. Radius $r_{spot}$ may be close to, equal to, or greater than the radius of the fiber core of optical fiber 30. The relationship may be optimized to determine element 24 that provides the optimal result.

Beam diverging element 24 may include one or more optical elements and may be located at any suitable point of the optical path. In certain embodiments, beam diverging element 24 may be located substantially at, near, or in front of a front focal point of fiber coupling optics 26.

Referring back to FIG. 1, beam shaping element 23 may be any suitable refracting and/or reflecting optical element, such as aspheric lenses or reflectors. For example, beam shaping element 23 may be a condensing lens that changes the propagation angles of the rays of the light in different ways to change the shape of the cross-section of the beam. In certain embodiments, beam shaping element 23 may shape the laser light into a beam with an elliptical cross-section.

The elliptical cross-section may have any suitable size, for example, a maximum diameter that is longer than the diameter of the fiber core and a minimum diameter that is shorter than the fiber core diameter. In other words, the beam may overfill the fiber in one direction but not the other direction. The underfill may occur near the edge of the fiber core, as described with reference to FIG. 3. The resulting beam may allow for a higher power transmission with a more uniform illumination pattern.

Fiber coupling optics 26 directs the diverged laser light towards a spot of a cross-section of a fiber core of an optical fiber 30. Examples of fiber coupling optics 26 include multi-element lenses, mirrors, and aspherical elements.

In certain embodiments, optical fiber 30 is a transparent fiber that operates as a waveguide to transmit light. Optical fiber 30 has a transparent fiber core surrounded by a cladding material and may be a multimodal fiber. Optical fiber 30 may have any suitable diameter, e.g., a fiber core diameter in the range of less than 25 micrometers (μm), such as 20 or 10 μm. For example, optical fiber 30 may have a 20 μm fiber core and a 30 μm cladding. Optical fiber 30 may have any suitable NA, e.g., NA>0.5.

FIG. 3 illustrates a spot 52 of a light beam with respect to a cross-section 50 of the fiber core of optical fiber 30. Spot 52 shows the shape of the cross-section of the light beam. In the example, the light beam has an elliptical cross-section. Spot 52 (or focal spot) may intersect any suitable portion of cross-section 50. In the example, spot 52 intersects cross-section 50 such that a center point 54 of spot 52 is located at a distance d from a center point 58 of cross-section 50. Distance d may have any suitable value, such as a value where an edge of spot 52 is near to or at an edge of cross-section 50.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

Other modifications are possible without departing from the scope of the invention. For example, the description illustrates embodiments in particular practical applications, yet other applications will be apparent to those skilled in the art. In addition, future developments will occur in the arts discussed herein, and the disclosed systems, apparatuses, and methods will be utilized with such future developments.

The scope of the invention should not be determined with reference to the description. In accordance with patent statutes, the description explains and illustrates the principles and modes of operation of the invention using exemplary embodiments. The description enables others skilled in the art to utilize the systems, apparatuses, and methods in various embodiments and with various modifications, but should not be used to determine the scope of the invention.

The scope of the invention should be determined with reference to the claims and the full scope of equivalents to which the claims are entitled. All claims terms should be given their broadest reasonable constructions and their ordinary meanings as understood by those skilled in the art, unless an explicit indication to the contrary is made herein. For example, use of the singular articles such as "a," "the," etc. should be read to recite one or more of the indicated elements, unless a claim recites an explicit limitation to the contrary. As another example, "each" refers to each member of a set or each member of a subset of a set, where a set may include zero, one, or more than one element. In sum, the invention is capable of modification, and the scope of the invention should be determined, not with reference to the description, but with reference to the claims and their full scope of equivalents.

What is claimed is:

1. A system comprising:
    a laser system configured to emit collimated laser light;
    a beam shaping element configured to shape the laser light to yield an elliptical cross-section;
    a beam diverging element configured to diverge the laser light to yield a range of propagation angles with a maximum angle greater than zero; and
    one or more fiber coupling optics configured to direct the diverged laser light towards a spot of a cross-section of a fiber core of an optical fiber, a center point of the spot located at a distance away from a center point of the cross-section such that an edge of the spot is near to or at an edge of the cross-section, the maximum angle being equivalent to an angle corresponding to the numerical aperture of the optical fiber, a maximum diameter of the elliptical cross-section being longer than a diameter of the fiber core, and a minimum diameter of the elliptical cross-section being shorter than the diameter of the fiber core.

2. The system of claim 1, the beam diverging element located substantially at a front focal point of the fiber coupling optics.

3. The system of claim 1, the beam diverging element comprising a diffuser configured to diffuse the laser light.

4. The system of claim 1, the beam diverging element comprising a diffractive optical element configured to diffract a plurality of rays of the laser light to yield the rays travelling in different directions.

5. The system of claim 1, the beam diverging element comprising a holographic optical element configured to split and diffract the laser light.

6. The system of claim 1, the maximum angle approximately equivalent to $\arctan(r_{spot}/f_{optics})$, $r_{spot}$ representing a radius of the spot, $f_{optics}$ representing a focal length of the fiber coupling optics.

7. A method comprising:
    receiving, by a beam diverging element, collimated laser light from a laser system;
    shaping, by a beam shaping element, the laser light to yield an elliptical cross-section;
    diverging, by the beam diverging element, the laser light to yield a range of propagation angles with a maximum angle greater than zero; and
    directing, by one or more fiber coupling optics, the laser light towards a spot of a fiber core of an optical fiber, a center point of the spot located at a distance away from a center point of the cross-section such that an edge of the spot is near to or at an edge of the cross-section, the maximum angle being equivalent to an angle corresponding to the numerical aperture of the optical fiber, a maximum diameter of the elliptical cross-section being longer than a diameter of the fiber core, and a minimum diameter of the elliptical cross-section being shorter than the diameter of the fiber core.

8. The method of claim 7, the diverging the laser light further comprising:
    diffusing the laser light.

9. The method of claim 7, the diverging the laser light further comprising:
    diffracting a plurality of rays of the laser light to yield the rays travelling in different directions.

10. The method of claim 7, the diverging the laser light further comprising:
    splitting and diffracting the laser light.

11. The method of claim 7, the maximum angle approximately equivalent to $\arctan(r_{spot}/f_{optics})$, $r_{spot}$ representing a radius of the spot, $f_{optics}$ representing a focal length of the fiber coupling optics.

* * * * *